(12) United States Patent
Kuroyabu et al.

(10) Patent No.: US 8,310,219 B2
(45) Date of Patent: Nov. 13, 2012

(54) DC-DC CONVERTER WITH A PWM MODE AND A CONTINUOUSLY ON MODE

(75) Inventors: Masaki Kuroyabu, Tama (JP); Keizo Kumagai, Tama (JP); Takashi Hiroshima, Tama (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 536 days.

(21) Appl. No.: 12/606,308

(22) Filed: Oct. 27, 2009

(65) Prior Publication Data

US 2010/0102788 A1 Apr. 29, 2010

(30) Foreign Application Priority Data

Oct. 29, 2008 (JP) ................................ 2008-277644

(51) Int. Cl.
   *G05F 1/56* (2006.01)
(52) U.S. Cl. ......... 323/271; 323/284; 323/285; 323/299
(58) Field of Classification Search .................. 323/271, 323/284, 285, 299
   See application file for complete search history.

(56) References Cited

U.S. PATENT DOCUMENTS

| | | | | |
|---|---|---|---|---|
| 7,012,413 B1* | 3/2006 | Ye | ................... | 323/284 |
| 7,239,120 B2* | 7/2007 | Adragna et al. | ............... | 323/285 |
| 7,262,588 B2 | 8/2007 | Matsuo et al. | | |
| 7,279,876 B2* | 10/2007 | Adragna et al. | ............... | 323/284 |
| 7,292,016 B2* | 11/2007 | Wake | ............................ | 323/271 |
| 7,319,311 B2* | 1/2008 | Nishida | .......................... | 323/284 |
| 7,482,796 B2* | 1/2009 | Nishida | .......................... | 323/284 |
| 7,733,072 B2* | 6/2010 | Kanakubo | ..................... | 323/271 |
| 7,876,080 B2* | 1/2011 | Dwarakanath et al. | ....... | 323/284 |
| 8,143,865 B2* | 3/2012 | Grant | ............................ | 323/222 |
| 8,207,723 B2* | 6/2012 | Odell | ............................ | 323/285 |
| 2009/0315523 A1* | 12/2009 | Kumagai et al. | ............. | 323/272 |
| 2010/0102788 A1* | 4/2010 | Kuroyabu et al. | ............ | 323/282 |
| 2012/0105031 A1* | 5/2012 | Kumagai | ...................... | 323/271 |

FOREIGN PATENT DOCUMENTS

| | | |
|---|---|---|
| JP | 2003-219637 A | 7/2003 |
| JP | 2005-160254 A | 6/2005 |
| JP | 2006-149067 A | 6/2006 |
| JP | 2008-079378 A | 4/2008 |
| JP | 2008-125184 A | 5/2008 |

OTHER PUBLICATIONS

Japanese Office Action dated Sep. 11, 2012 (and English translation thereof) in counterpart Japanese Application No. 2008-277644.

* cited by examiner

*Primary Examiner* — Jeffrey Sterrett
(74) *Attorney, Agent, or Firm* — Holtz, Holtz, Goodman & Chick, PC (57) ABSTRACT

A DC-DC converter including, an inductor; and a driving switching element for performing switching to a flow path to flow an electric current through the inductor; wherein the DC-DC converter drives the driving switching element by PWM control using a PWM control pulse to convert a direct-current input voltage supplied from a direct-current power source and to output a direct-current voltage having a piece of electric potential different from that of the direct-current input voltage, and wherein the DC-DC converter drives the driving switching element by the PWM control under a first condition, and the DC-DC converter makes the driving switching element be in an on-state continuously while the output direct-current voltage is lower than a desired level under a second condition.

5 Claims, 5 Drawing Sheets

DC-DC CONVERTER WITH A PWM MODE AND A CONTINUOUSLY ON MODE

BACKGROUND OF THE INVENTION

1. Field of the Invention

The present invention relates to a DC-DC converter of a switching regulator system for converting a direct-current voltage, and more particularly to a technique effective for being applied to a DC-DC converter performing a switching drive in a pulse width modulation (PWM) control mode when an input voltage is high and switching the drive system thereof when the input voltage becomes low.

2. Related Art

There is a DC-DC converter of a switching regulator system as a circuit for converting a direct-current input voltage into a direct-current voltage of a piece of different electric potential and outputting the converted direct-current voltage. Among these type of DC-DC converters, there is a DC-DC converter equipped with a driving switching element making an electric current flow through an inductor (coil) by applying a direct-current voltage supplied from a direct-current power source, such as a battery, to the inductor to accumulate energy in the coil, a rectifying element rectifying the electric current of the coil during an energy discharging period, in which the driving switching element is turned off, and a control circuit performing the on-off control of the driving switching element.

Each of these DC-DC converters of the switching regulator systems detects the magnitude of the output voltage of the DC-DC converter with an error amplifier to feed back the detected magnitude of the output voltage to a pulse width modulation (PWM) comparator or a pulse frequency modulation (PFM) comparator, and performs the control of the on-time of the switching element so as to elongate the on-time when the output voltage lowers and so as to shorten the on-time when the output voltage rises.

Figure 4:
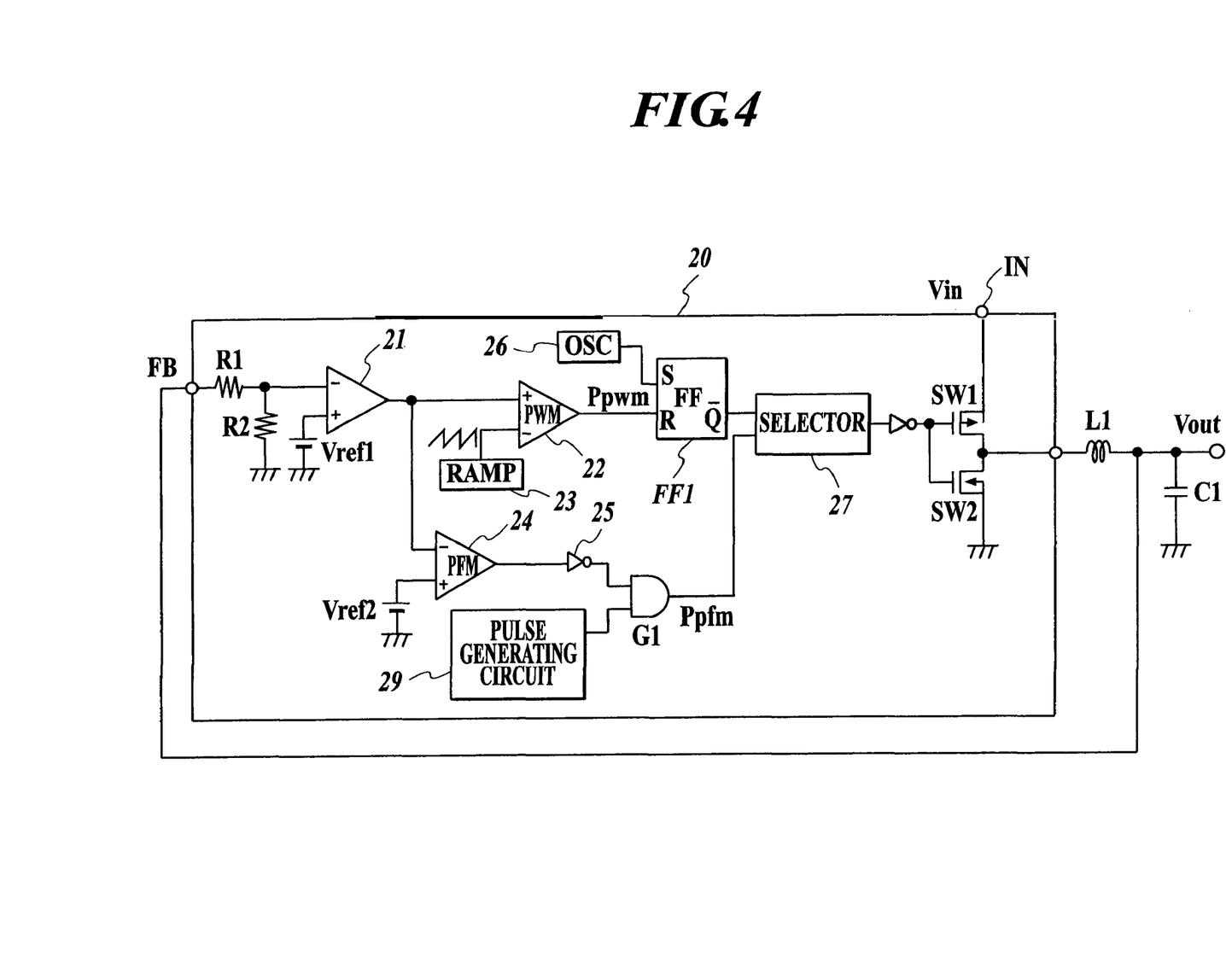
FIG. 4 is a circuit configuration diagram showing the configuration of a conventional DC-DC converter of a PWM/PFM switching system.

Furthermore, although the pulse widths of drive pulses are changed according to a load with the period (frequency) of the drive pulses fixed to be constant, the pulses each having a minimum pulse width determined on the basis of the characteristics of the circuit are output even if the load becomes very light by the PWM control. Moreover, if the range of the fluctuation of loads is very large, then the case where the output current of the DC-DC converter is too large even if the DC-DC converter is driven by the pulses each having the minimum pulse width sometimes occurs. Accordingly, as shown in FIG. 4, there is also a DC-DC converter which is equipped with both of a PWM comparator 22 and a PFM comparator 24 and is configured so as to perform the PWM control normally and so as to move the control method thereof to the PFM control for driving the DC-DC converter with fixed pulses each having a constant pulse width and a period changing according to the load of the DC-DC converter when the electric current flowing through the load becomes small, that is, at the time of a light load. There are the inventions described in, for example, Japanese Patent Application Laid-Open Publications No. 2006-149067 and No. 2003-219637 as the inventions pertaining to these DC-DC converters.

Figure 5A:
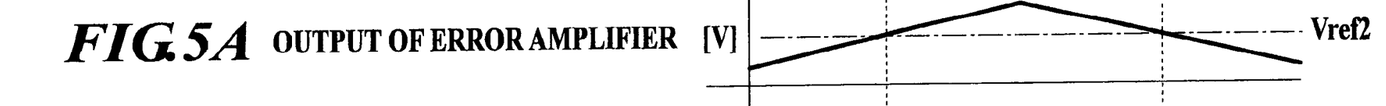
FIGS. 5A, 5B, 5C, 5D and 5E are timing charts showing the changing states of the signal and the electric potential in each section of the conventional DC-DC converter of the PWM/PFM switching system.
Figure 5B:
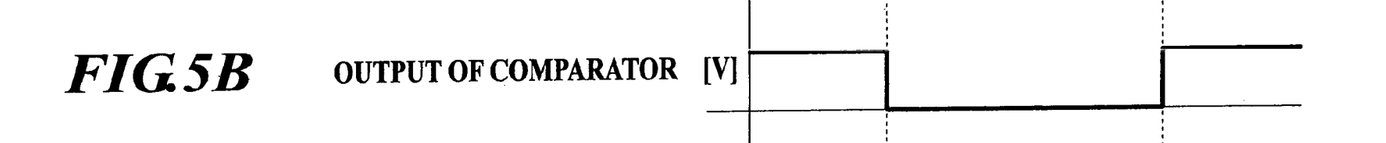
Figure 5C:
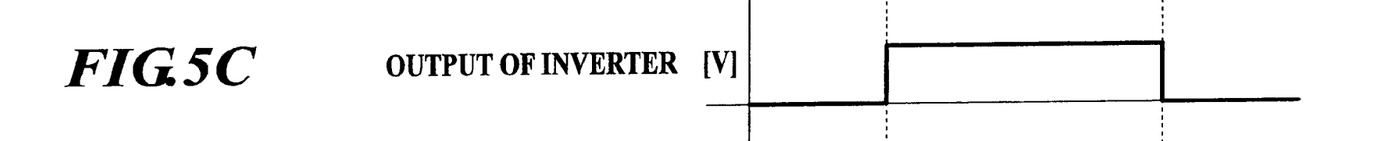

In the PFM control mode at the time of a light load of a DC-DC converter performing the drive of the switching element thereof by switching the PWM control and the PFM control as shown in FIG. 4, the output of the PFM comparator 24 changes to a low level when the output of an error amplifier 21 exceeds a reference voltage Vref2 as shown in FIGS. 5A and 5B. Then, as shown in FIG. 5C, the output of an inverter 25 changes to a high level to open an AND gate G1, and pulses from a pulse generating circuit 29 generating the pulses each having a fixed pulse width are supplied to switching elements SW1 and SW2 through a selector 27. The DC-DC converter is configured to thus perform a switching drive.

The DC-DC converter of the PWM/PFM switching system shown in FIG. 4 has an advantage capable of improving the power efficiency thereof at the time of a light load in comparison with a DC-DC converter equipped with only a PWM control function. However, the periods of pulses are longer and the frequency of switching is less by a drive based on PFM control pulses than those by a drive based on PWM control pulses during the period in which an input voltage is comparatively high, but when the potential difference between an input voltage and an aimed output voltage becomes small owing to a consumption of a battery in a system using the battery as the inputting power source thereof, the periods of the pulses become short as shown in FIG. 5E and the frequency of switching increases. Then, there is a disadvantage that the power efficiency lowers because a flow-through current flowing through the switching elements SW1 and SW2 becomes large when the frequency of switching is large.

Figure 5D:
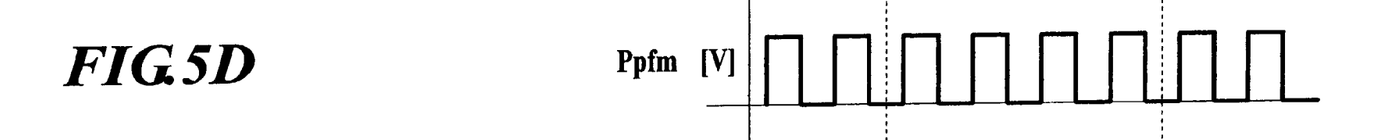
Figure 5E:
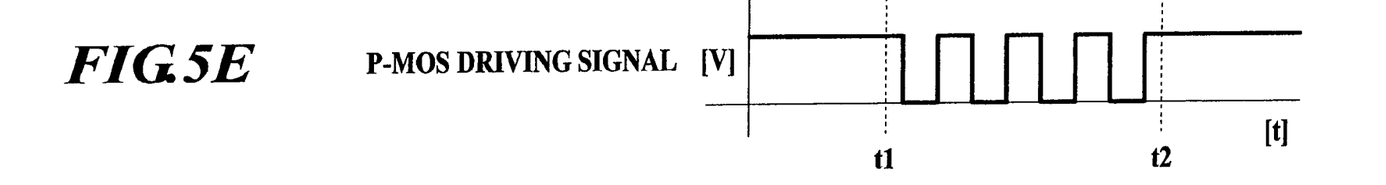

Moreover, as shown in FIG. 5D, each of the pulses generated by a pulse generating circuit is generally designed so as to have a fixed pulse width and a duty cycle of up to 50%, that is, is designed so that the on-time thereof and the off-time thereof may be the same at a maximum. Consequently, the range of an input voltage is limited by the duty cycle. That is, when the input voltage becomes a certain level or less, the duty cycle of the pulse does not become larger than that at that time. Consequently, it is found that there is a problem of the occurrence of the insufficiency of the electric current flowing through the coil of a DC-DC converter to cause the impossibility of obtaining a desired output voltage.

SUMMARY OF THE INVENTION

The present invention is directed to provide a control technique of a DC-DC converter having a PWM control mode for improving the power efficiency when an input voltage lowers and enabling the input voltage range in which a desired output voltage can be obtained to be widened.

According to an aspect of the present invention, there is provided a DC-DC converter including: an inductor; and a driving switching element for performing switching to a flow path to flow an electric current through the inductor; wherein the DC-DC converter drives the driving switching element by PWM control using a PWM control pulse to convert a direct-current input voltage supplied from a direct-current power source and to output a direct-current voltage having a piece of electric potential different from that of the direct-current input voltage, and wherein the DC-DC converter drives the driving switching element by the PWM control under a first condition, and the DC-DC converter makes the driving switching element be in an on-state continuously while the output direct-current voltage is lower than a desired level under a second condition.

To put it more concretely, a DC-DC converter includes: a voltage converting inductor; a driving switching element for performing switching to a flow path to apply a direct-current input voltage supplied from a direct-current power source to the inductor to flow an electric current through the inductor to accumulate energy therein; a rectifying element for rectifying the electric current of the inductor during an energy discharging period in which the driving switching element is off; an error amplifier for outputting a voltage according to an output voltage; a first comparator for comparing an output of the error amplifier with a waveform signal having a predetermined frequency; a second comparator for comparing the output of the error amplifier with a predetermined reference voltage; and a switching control circuit for performing on-time control of the driving switching element based on either of an output of the first comparator and an output of the second comparator, wherein the DC-DC converter drives the driving switching element by PWM control based on the output of the first comparator when the direct-current input voltage is higher than a predetermined level, and the DC-DC converter makes the driving switching element be in an on-state continuously based on the output of the second comparator while the output voltage is lower than a desired level when the direct-current input voltage is lower than the predetermined level.

According to the DC-DC converter having the configuration described above, when the input voltage thereof lowers, the driving switching element is not repeatedly switched, but the driving switching element is made to be in the on-state thereof continuously. Consequently, flow-through currents at the time when the input voltage lowers can be prevented to improve the power efficiency of the DC-DC converter. In addition, because the output voltage can be ensured by making an output current flow continuously even if the input voltage lowers to be considerably close to the output voltage, the input voltage range in which a desired output voltage can be obtained can be widened.

Moreover, the DC-DC converter may be also configured to include: a voltage converting inductor; a driving switching element for performing switching to a flow path to apply a direct-current input voltage supplied from a direct-current power source to the inductor to flow an electric current through the inductor to accumulate energy therein; a rectifying element for rectifying the electric current of the inductor during an energy discharging period in which the driving switching element is off; an error amplifier for outputting a voltage according to an output voltage; a first comparator for comparing an output of the error amplifier with a waveform signal having a predetermined frequency; a second comparator for comparing the output of the error amplifier with a predetermined reference voltage; a selection section for selecting either of an output of the first comparator and an output of the second comparator; and a switching control circuit for performing on-time control of the driving switching element based on either of the outputs of the first comparator and the second comparator, wherein the DC-DC converter drives the driving switching element by PWM control based on the output of the first comparator when the selecting section selects the output of the first comparator, and the DC-DC converter makes the driving switching element be in an on-state continuously based on the output of the second comparator while the output voltage is lower than a desired level when the selecting section selects the output of the second comparator. Then, the DC-DC converter is configured so that a control signal for switching the selecting section may be input from an outside. Thereby, the configuration of the switching control circuit to perform the control described above can be simplified.

Alternatively, the DC-DC converter may be configured to be provided with an input voltage detecting circuit capable of detecting whether the direct-current input voltage is higher or lower than a predetermined level, wherein the selecting section is switched according to an output of the detecting circuit. Thereby, the switching of the control mode of the DC-DC converter can be performed without inputting any switching control signals from the outside.

Furthermore, preferably, the DC-DC converter may be configured to be further provided with a pulse generating circuit to generate pulses each having a fixed pulse width, and a logic circuit to form PFM control pulses based on the pulses generated by the pulse generating circuit and the output of the second comparator, wherein the DC-DC converter drives the driving switching element by the PWM control based on the output of the first comparator when the direct-current input voltage is higher than the predetermined level and a load is heavier than a predetermined value; the DC-DC converter drives the driving switching element by a PFM drive based on the PFM control pulses when the direct-current input voltage is higher than the predetermined level and a load is lighter than the predetermined value; and the DC-DC converter makes the driving switching element be in the on-state thereof continuously while the output voltage is lower than the desired level based on the output of the second comparator when the direct-current input voltage is lower than the predetermined level. Thereby, the PWM control and the PFM control can be automatically switched according to the magnitude of a load to improve the power efficiency of the DC-DC converter, and the power efficiency in the case where an input voltage lowers can be further improved by switching the drive systems according to the input voltage.

According to the present invention, it is possible to obtain the advantages of improving the power efficiency at the time when an input voltage lowers and of widening the input voltage range in which a desired output voltage can be obtained in a DC-DC converter having the PWM control mode.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

In the following, preferable embodiments of the present invention will be described with reference to accompanying drawings.

Figure 1:
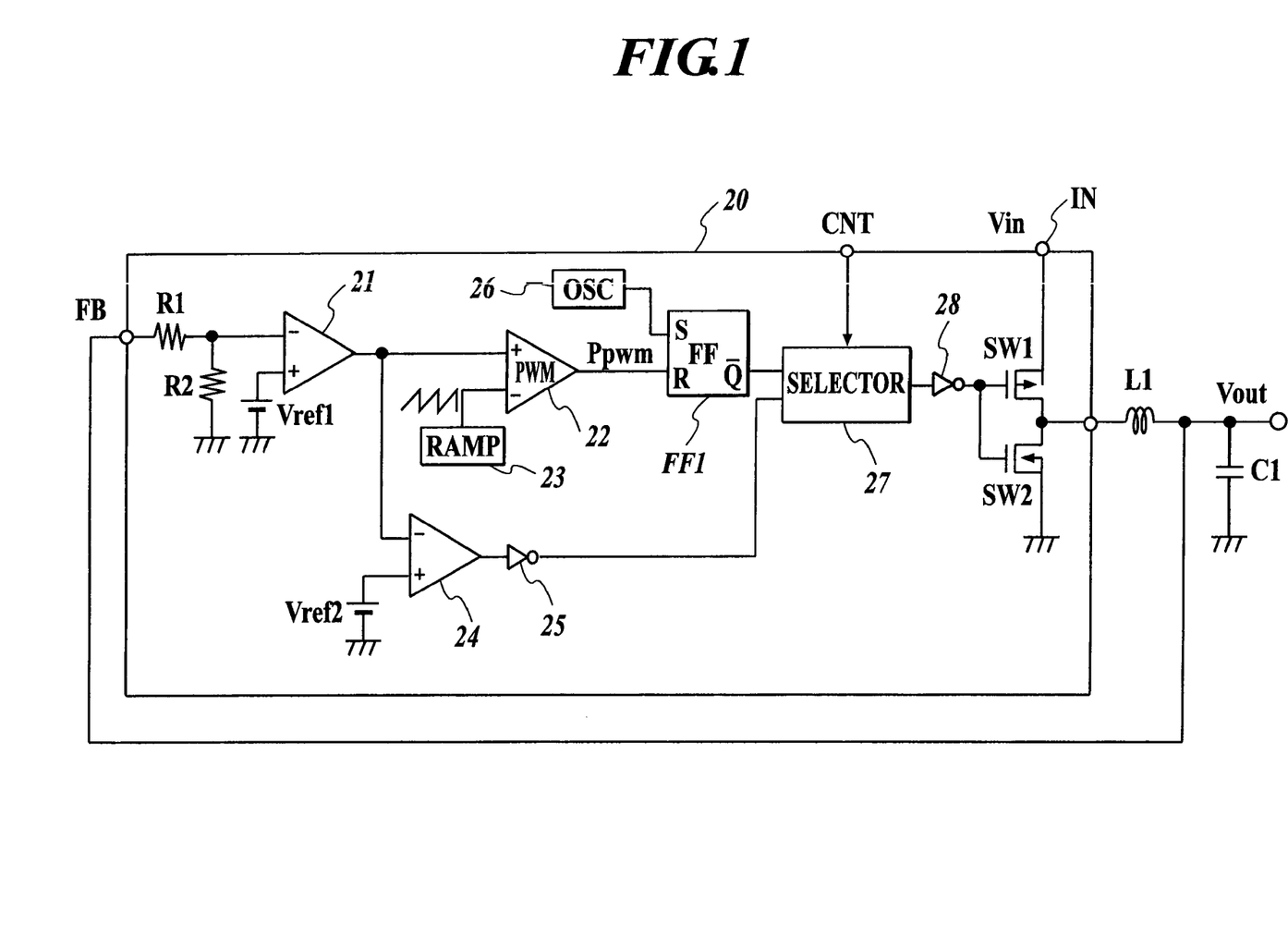
FIG. 1 is a circuit configuration diagram showing a first embodiment of the DC-DC converter to which the present invention is applied.

FIG. 1 shows an embodiment of the DC-DC converter of a switching regulator system to which the present invention is applied.

The DC-DC: converter of this embodiment includes a coil L1 as an inductor; a driving transistor SW1 as a switching element, which is connected between a voltage input terminal IN to receive the application of a direct-current input voltage Vin and a terminal of the coil L1 on one side, and is composed of a positive (P) channel metal-oxide semiconductor (MOS) field effect transistor (FET) (insulated-gate field effect transistor) for making an electric current flow through the coil L1; a rectifying transistor SW2, which is connected between the voltage input terminal IN and a ground point in series with the driving transistor SW1 and is composed of a negative (N) channel MOS FET; a switching control circuit 20 to perform the on-off control of these switching transistors SW1 and SW2; and a smoothing capacitor C1 connected between the terminal of the coil L1 on the other side and the ground point.

Although the followings are not especially limited to be as they are, the elements other than the coil L1 and the smoothing capacitor C1 among the elements constituting the DC-DC converter are formed on a semiconductor chip; the control circuit 20 and the switching transistors SW1 and SW2 are formed as a semiconductor integrated circuit (IC); and the coil L1 and the capacitor Cl are connected, as external elements, to the external terminals formed in the IC.

The DC-DC converter of this embodiment is configured so that the switching control circuit 20 may generate drive pulses for turning on and off the transistors SW1 and SW2 in a complementary style. In a steady state, when the driving transistor SW1 is turned on, the direct-current input voltage Vin is applied to the coil L1, and an electric current in the direction of the output terminal of the DC-DC converter flows through the coil L1 to charge the smoothing capacitor C1. When the driving transistor SW1 is turned off, the rectifying transistor SW2 is turned on in turn, and an electric current flows in the coil L1 through the turned-on transistor SW2. Then, the pulse widths of the drive pulses input into the control terminal (gate terminal) of the driving transistor SW1 are controlled according to the output voltages of the DC-DC converter. Thereby, a direct-current output voltage Vout, which is a stepped-down voltage of the direct-current input voltage Vin is generated.

The switching control circuit 20 includes bleeder resistors R1 and R2, which are connected between a voltage feedback terminal FB and the ground point in series with each other to divide the output voltage Vout by the resistance ratio between them; an error amplifier 21 for comparing the voltage divided by the bleeder resistors R1 and R2 with a reference voltage Vref1 to output a voltage according to the potential difference between them; a PWM comparator 22 for receiving an output of the error amplifier 21 as an input to the non-inverting input terminal thereof; and a waveform generating circuit 23 for generating a saw-tooth waveform signal RAMP to be input into the inverting input terminal of the comparator 22.

Moreover, the switching control circuit 20 includes a comparator 24 for receiving the output of the error amplifier 21 as an input of the inverting input terminal of the comparator 24 and receiving a reference voltage Vref2 as an input of the non-inverting input terminal thereof; an inverter 25 for inverting the output of the comparator 24; a clock generating circuit 26 equipped with an oscillating circuit to generate and output clock pulses ϕc of a frequency of 1 MHz or the like; a reset-set (RS) flip flop FF1 for performing a resetting operation according to an output of the PWM comparator 22 on the basis of the clock pulses ϕc; a selector 27 fcr selecting either of the output of the flip flop FF1 and the output of the inverter 25; and a driver 28 for generating a signal for performing the on-off drives of the switching transistors SW1 and SW2 according to the signal selected by the selector 27. A change-over switch may be used in place of the selector 27.

Because the output of the error amplifier 21 is input into the non-inverting input terminal of the PWM comparator 22 and the saw-tooth waveform signal RAMP generated by the waveform generating circuit 23 is input into the inverting input terminal of the PWM comparator 22, the PWM comparator 22 outputs PWM pulses Ppwm each having a pulse width according to the output level of the error amplifier 21. Consequently, when the output voltage is high, a PWM pulse Ppwm having a narrow pulse width is output, and the on-time of the switching element SW1 is made to be small. Moreover, when the output voltage is low, a PWM pulse Ppwm having a wide pulse width is output, and the on-time of the switching element SW1 is elongated. Thereby, the output voltage Vout is controlled to be constant.

In this embodiment, the selector 27 is switched by a switching control signal CNT input from the outside. The selector 27 is controlled as follows. In a PWM control mode, the selector 27 selects the output of the RS flip flop FF1 to perform a resetting operation by the output Ppwm of the PWM comparator 22. In a mode other than the PWM control mode, the selector 27 selects the output of the inverter 25 inverting the output of the comparator 24.

Figure 2A:
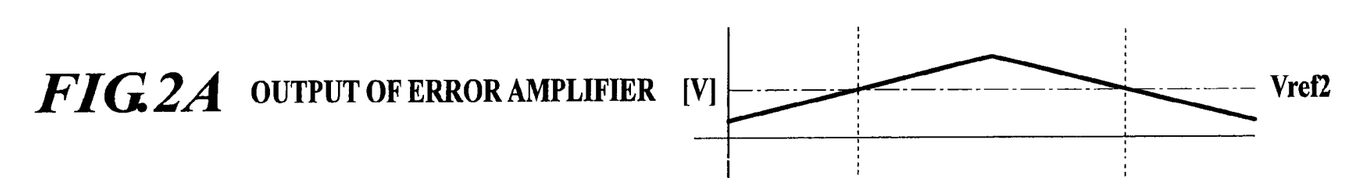
FIGS. 2A, 2B, 2C and 2D are timing charts showing the changing states of the signal and the electric potential in each section of the DC-DC converter of the first embodiment.
Figure 2B:
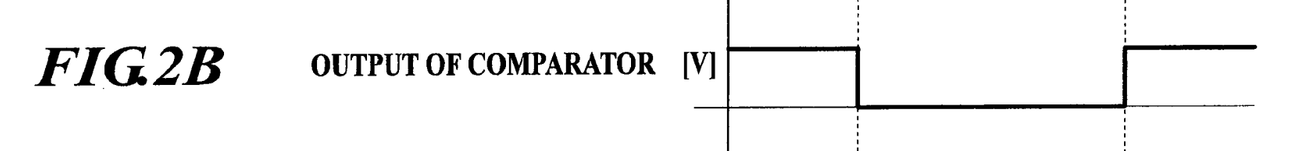
Figure 2C:
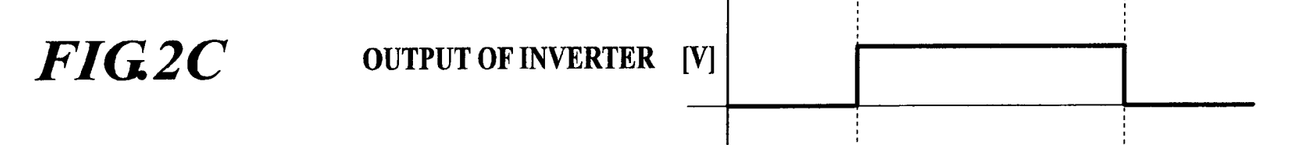
Figure 2D:
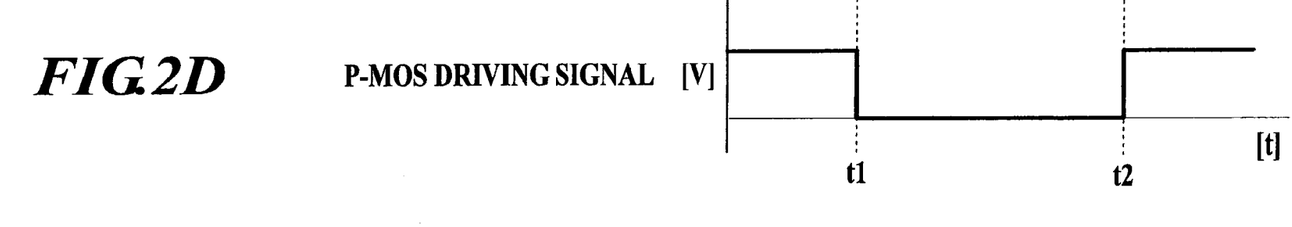

When the output of the error amplifier 21 exceeds the reference voltage Vref2 as shown in FIG. 2A in the case where the selector 27 is switched so as to select the output of the inverter 25 by the switching control signal CNT, then the output of the comparator 24 changes to the low level as shown in FIG. 2B, and the output of the inverter 25 changes to the high level as shown in FIG. 2C (at timing t1). Then, this output is supplied to the switching elements SW1 and SW2 through the selector 27 and the driver 28. Thereby the switching element SW1 is turned on, and the switching element SW2 is turned off as shown in FIG. 2D. Thus, an electric current flows through the coil L1 continuously. Then, when the output voltage rises and the output of the error amplifier 21 becomes lower than the reference voltage Vref2 of the comparator 24, the output of the error amplifier 21 changes to the low level (FIG. 2A), and the output of the inverter 25 changes to the low level (FIG. 2C). Thus the switching element SW1 is turned off, and the switching element SW2 is turned on as shown in FIG. 2D (at timing t2).

In the DC-DC converter having the PFM comparator 24 as shown in FIG. 4, if the switching elements SW1 and SW2 are repeatedly switched in a PFM control mode, especially if the input voltage Vin becomes low to be close to the output voltage Vout, then the switching elements SW1 and SW2 are frequently switched, and a flow-through current increases to lower the power efficiency of the DC-DC converter. In contrast to this, because the switching element SW1 is driven to be in the on-state thereof continuously when the DC-DC converter of the present embodiment is switched from a PWM control mode to the mode using the output of the comparator 24, the flow-through current generated by switching can be reduced, and the power efficiency of the DC-DC converter can be improved.

Accordingly, for example, a central processing unit (CPU) controlling the whole system detects the lowering of the input voltage Vin to change the switching control signal CNT, and thereby switches the DC-DC converter from the PWM control mode to the mode using the output of the comparator 24. Thus, the DC-DC converter of the present embodiment can function effectively. Alternatively, the CPU may be provided with tie function of detecting a light load state to change the switching control signal CNT according to a load state. Then, when the control signal CNT instructs the PWM control mode, the DC-DC converter uses the output of the PWM comparator 22. In the cases other than that the PWM control mode is instructed, the switching control circuit 20 may have the function of performing switching by automatically judging whether to use the output of the PWM comparator 22 or whether to use the output of the comparator 24.

Moreover, although the embodiment is configured so as to switch the selector 27 on the basis of the switching control signal CNT input from the outside, the DC-DC converter may be configured as follows. That is, the DC-DC converter is provided with an input voltage detecting circuit detecting whether or not the input voltage Vin becomes the predetermined level or less. When the input voltage Vin is the predetermined level or more, the selector 27 selects the output of the PWM comparator 22. When the input voltage Vin is the predetermined level or less, the selector 27 selects the output of the comparator 24.

Figure 3:
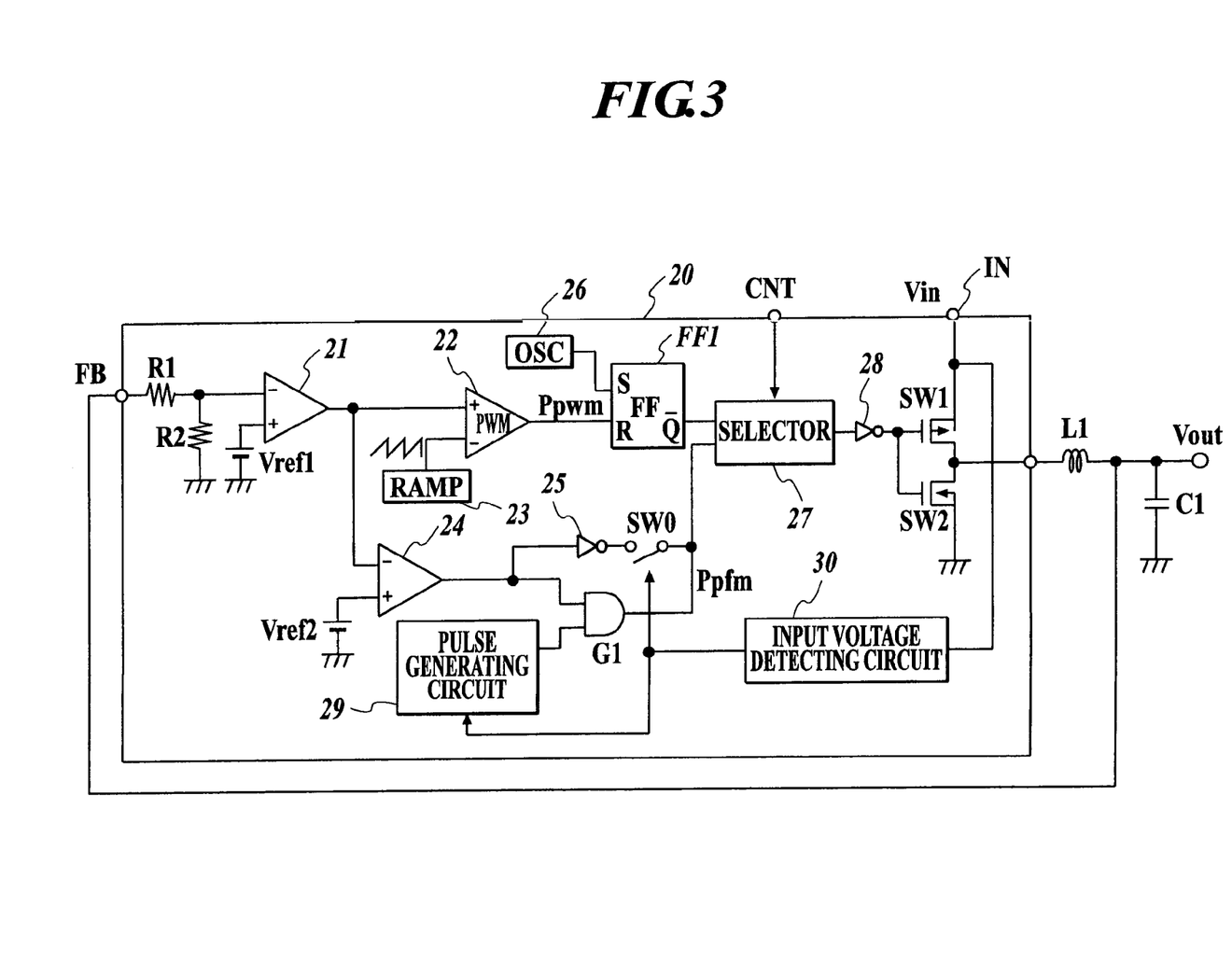
FIG. 3 is a circuit configuration diagram showing another embodiment of the DC-DC converter to which the present invention is applied.

FIG. 3 shows another embodiment of the DC-DC converter of the switching regulator system to which the present invention is applied.

This embodiment is provided with a pulse generating circuit 29 for generating pulses Ppfm each having a fixed pulse width, and an AND gate G1 for receiving the output of the comparator 24 and the pulses Ppfm as inputs of the AND gate G1 in addition to the circuits constituting the DC-DC converter of the aforesaid embodiment. This embodiment makes the comparator 24 operate as a PFM comparator. Moreover, this embodiment is provided with an on-off switch SW0 at the subsequent stage of the inverter 25 for inverting the output of the comparator 24, and an input voltage detecting circuit 30 for detecting whether or not the input voltage Vin becomes a predetermined level or less. Then, this embodiment is configured so as to stop the operation of the pulse generating circuit 29 (fix the output thereof at the low level) when the input voltage Vin becomes the predetermined level or less, and to drive the switching elements SW1 and SW2 by turning on the switch SW0 to supply the output of the inverter 25 for inverting the output of the comparator 24 to the selector 27.

Also in the DC-DC converter of the present embodiment, the selector 27 is switched by the PWM/PFM switching control signal CNT input from the outside. In the PWM control mode, the selector 27 selects the output of the RS flip flop FF1 performing a resetting operation on the basis of the output Ppwm of the PWM comparator 22. In the PFM control mode, the selector 27 operates so as to select the output of the AND gate G1 or the inverter 25. Consequently, in the case where the mode is the PFM control mode and the input voltage Vin is higher than the predetermined level, the switching elements SW1 and SW2 are driven on the basis of the output of the AND gate G1 to be controlled by the PFM control. In the case where the mode is the PFM control mode and the input voltage Vin becomes lower than the predetermined level, the switching elements SW1 and SW2 are driven by the output of the inverter 25, and the switching element SW1 is continuously made to be in the on-state thereof while the output of the comparator 24 is the low level as shown in FIGS. 2B and 2D. Consequently, when the input voltage Vin becomes lower than the predetermined level, the flow-through current generated by switching can be reduced and the power efficiency can be improved similarly to the first embodiment.

Incidentally, this embodiment may be configured as follows. That is, the function of detecting a load state (magnitude) is provided in the switching control circuit 20. When the switching control signal CNT instructs the PWM control mode, the output of the PWM comparator 22 is used. When the switching control signal CNT does not instruct the PWM control mode, it is automatically judged to be switched according to the states of the input voltage and the load at that time whether the output of the PWM comparator 22 is used or whether the output of the comparator 24 (the output of the AND gate G1 or the inverter 25) is used.

To put it concretely, the DC-DC converter may be also controlled as follows. If the input voltage is higher than the predetermined level and the load is heavier than a predetermined value, the driving switching element SW1 is driven by the PWM control on the basis of the output of the PWM comparator 22. If the input voltage is higher than the predetermined level and the load is lighter than the predetermined value, the driving switching element SW1 is driven by the PFM drive on the basis of the PFM control pulses Ppfm. If the input voltage is lower than the predetermined level, the driving switching element SW1 is made to be in the on-state thereof continuously while the output voltage is lower than a desired level on the basis of the output of the comparator 24.

Incidentally, the function of detecting the state (magnitude) of a load can be realized by, for example, the configuration of connecting a current detecting resistor in series with the coil L1 or the transistor SW1 and amplifying the voltage between both the terminals of the resistor or the voltage between the drain and the source of the transistor SW1 with a differential amplifier to detect the magnitude of an output current.

In the above, although the invention devised by the inventor of the present invention has been concretely described on the basis of the embodiments, the present invention is not limited to the embodiments described above. For example, although the configuration of being provided with the clock generating circuit 26 and the flip flop FF1 between the PWM comparator 22 and the selector 27 has been shown in the embodiments, the clock generating circuit 26 and the flip flop FF1 may be omitted.

Moreover, although the switching control circuit 20 incorporating the circuit 23 generating a waveform signal (triangular wave) to be input into the PWM comparator 22 and the clock generating circuit 26 in the chip has been shown, it is possible to configure the switching control circuit 20 so as to supply the waveform signal and an oscillated signal that is the basis of clocks from the outside of the chip. Moreover, although the embodiments described above use the elements on the chip as the switching elements SW1 and SW2, external elements formed separately from the control circuit 20 may be used.

Furthermore, although the embodiments described above have shown the synchronously rectifying type DC-DC converter connecting the rectifying transistor SW2 in series with the driving transistor SW1 to turn on and off the rectifying transistor SW2 in a complementary style with the driving transistor SW1, it is also possible to apply the present invention to a diode rectifying type DC-DC converter using a diode in place of the rectifying transistor SW2.

Although the examples of applying the present invention to the step down type DC-DC converters have been described in the above description, the DC-DC converter of the present invention is not limited to that type. The present invention can be also applied to a step-up type DC-DC converter and an inverting type DC-DC converter generating negative voltages.

The entire disclosure of Japanese Patent Application No. 2008-277644 filed on Oct. 29, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A DC-DC converter, comprising:
an inductor; and
a driving switching element for performing switching to a flow path to flow an electric current through the inductor;
wherein the DC-DC converter drives the driving switching element by PWM control using a PWM control pulse to convert a direct-current input voltage supplied from a direct-current power source and to output a direct-current voltage having a piece of electric potential different from that of the direct-current input voltage, and wherein the DC-DC converter drives the driving switching element by the PWM control under a first condition, and the DC-DC converter makes the driving switching element be in an on-state continuously while the output direct-current voltage is lower than a desired level under a second condition.

2. A DC-DC converter, comprising:
a voltage converting inductor;
a driving switching element for performing switching to a flow path to apply a direct-current input voltage supplied from a direct-current power source to the inductor to flow an electric current through the inductor to accumulate energy therein;
a rectifying element for rectifying the electric current of the inductor during an energy discharging period in which the driving switching element is off;
an error amplifier for outputting a voltage according to an output voltage;
a first comparator for comparing an output of the error amplifier with a waveform signal having a predetermined frequency;
a second comparator for comparing the output of the error amplifier with a predetermined reference voltage; and
a switching control circuit for performing on-time control of the driving switching element based on either of an output of the first comparator and an output of the second comparator, wherein
the DC-DC converter drives the driving switching element by PWM control based on the output of the first comparator when the direct-current input voltage is higher than a predetermined level, and
the DC-DC converter makes the driving switching element be in an on-state continuously based on the output of the second comparator while the output voltage is lower than a desired Level when the direct-current input voltage is lower than the predetermined level.

3. A DC-DC converter, comprising:
a voltage converting inductor;
a driving switching element for performing switching to a flow path to apply a direct-current input voltage supplied from a direct-current power source to the inductor to flow an electric current through the inductor to accumulate energy therein;
a rectifying element for rectifying the electric current of the inductor during an energy discharging period in which the driving switching element is off;
an error amplifier for outputting a voltage according to an output voltage;
a first comparator for comparing an output of the error amplifier with a waveform signal having a predetermined frequency;
a second comparator for comparing the output of the error amplifier with a predetermined reference voltage;
a selection section for selecting either of an output of the first comparator and an output of the second comparator; and
a switching control circuit for performing on-time control of the driving switching element based on either of the outputs of the first comparator and the second comparator, wherein
the DC-DC converter drives the driving switching element by PWM control based on the output of the first comparator when the selecting section selects the output of the first comparator, and
the DC-DC converter makes the driving switching element be in an on-state continuously based on the output of the second comparator while the output voltage is lower than a desired level when the selecting section selects the output of the second comparator.

4. The DC-DC converter according to claim 3, wherein a control signal for switching the selecting section is input from an outside.

5. The DC-DC converter according to claim 3, further comprising an input voltage detecting circuit capable of detecting whether the direct-current input voltage is higher or lower than a predetermined level, wherein the selecting section is switched according to an output of the detecting circuit.

* * * * *